March 10, 1970  P. D. SCHRADER  3,499,483
MODULATING TEMPERATURE CONTROL APPARATUS
Filed Feb. 29, 1968
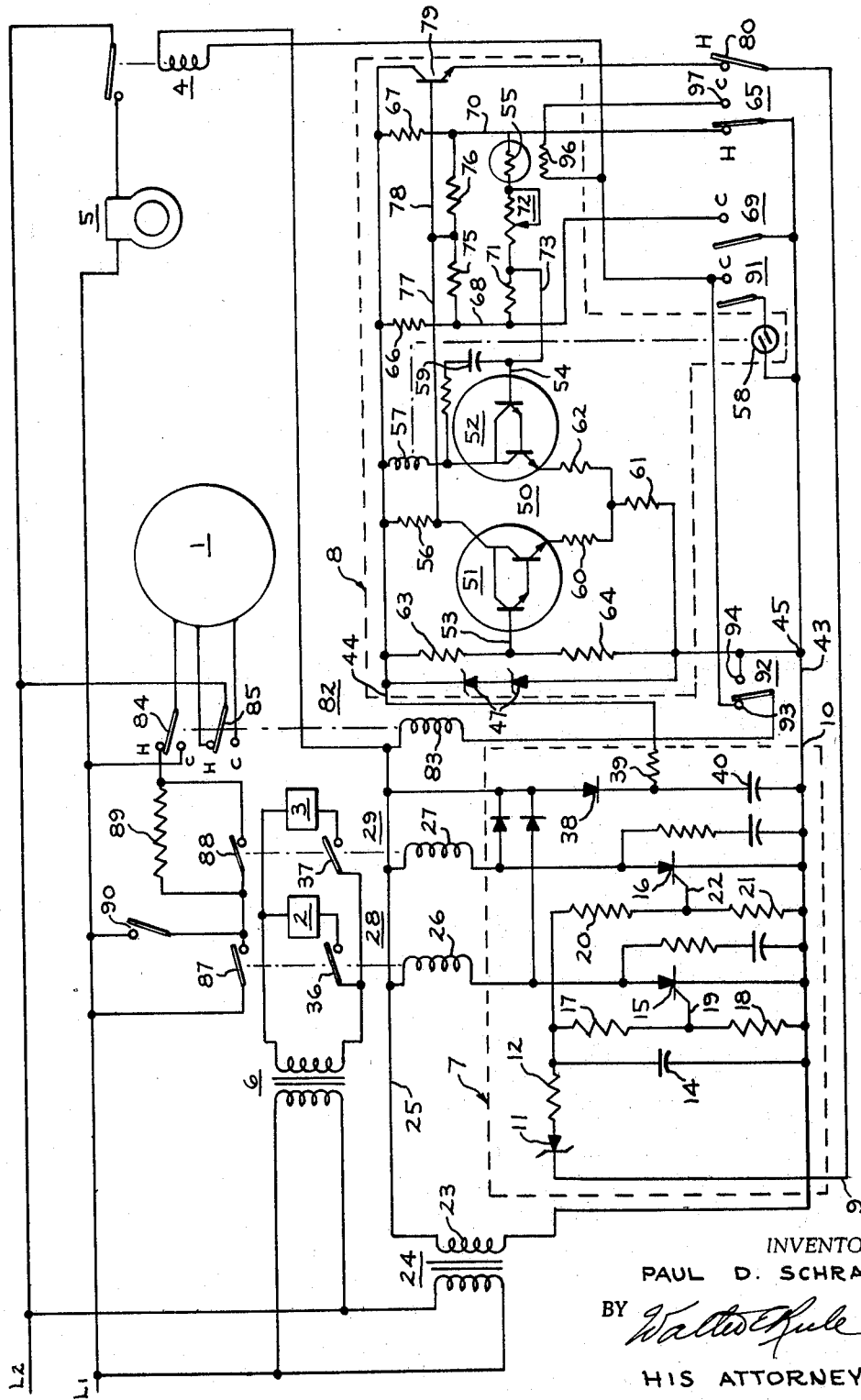
INVENTOR.
PAUL D. SCHRADER
BY Walter E. Rule
HIS ATTORNEY United States Patent Office 3,499,483
Patented Mar. 10, 1970

3,499,483
MODULATING TEMPERATURE CONTROL
APPARATUS
Paul D. Schrader, Louisville, Ky., assignor to General
Electric Company, a corporation of New York
Filed Feb. 29, 1968, Ser. No. 709,418
Int. Cl. F25b 29/00
U.S. Cl. 165—26                                    5 Claims

ABSTRACT OF THE DISCLOSURE

A temperature control apparatus for controlling the operation of an air conditioning device for heating, cooling, or heating and cooling a space and having at least two output stages with operating relays for each stage comprises means including a thermistor responsive to space temperature for supplying a control voltage which is variable with the space temperature. This voltage is supplied to parallel connected silicon controlled rectifiers for respectively energizing the relays. The silicon controlled rectifiers are gated to fire at different gating voltages and hence at different temperatures sensed by the thermistor to provide a staged or modulated output from the conditioning device. In a preferred form, the thermistor forms part of a modified Darlington single stage differential amplifier adapted to supply the controlled voltages to the silicon controlled rectifiers.

BACKGROUND OF THE INVENTION

For maximum comfort, and economy, it is desirable to maintain the temperature of a space being temperature conditioned within a relatively narrow temperature range and to control the output of the temperature conditioning device in accordance with the conditioning demand. The advantages of modulating the output of the temperature conditioning device whether it be a refrigeration system or a heating system are well known. However, most of the devices presently used have relied upon the concept of "on-and-off" cycling of the conditioning device in repsonse to sensed temperature to provide a degree of modulation. In recent years, semiconductor or solid state controls have made possible improved heating or cooling temperature modulation as compared, for example, with the operation of the usual bi-metal thermostat control means. Temperature conditioning controls of the solid state type are featured for example in the conditioning systems described in Patents 3,243,609, Kompelien and 3,334,672, Sones. These solid state controls have either provided an "on-off" modulation or have varied the energization of the conditioning device, as for example the speed of a refrigerant compressor, in response to the conditioning demand.

The present invention has as its principal object the provision of an improved temperature control apparatus comprising an air conditioning device having at least two output stages and a simple and low cost solid state circuitry for controlling the energization of one or more of the output stages in accordance with the conditioning requirements of the space being conditioned.

SUMMARY OF THE INVENTION

In accordance with the illustrated embodiment of the invention, there is provided an air conditioning device including a heating device operable at 2 output stages and electrical operating means for each of these stages. The circuitry for controlling the operation of the two stages includes a thermistor means adapted to sense the temperature of the space being conditioned and forming part of a solid state circuitry including separate silicon controlled rectifiers for respectively energizing the electrical operating means. The thermistor forms part of a gating voltage supply means for supplying a direct current voltage which varies with the temperatures sensed by the thermistor while voltage dividing means for connecting the gates of each of the rectifiers to this DC voltage supply are designed to fire one of the rectifiers at a first voltage and the other only at a higher voltage thereby to energize the heating device output stages in accordance with the conditioning demand of the space being conditioned.

BRIEF DESCRIPTION OF THE DRAWING

In the accompanying drawing the single figure is a schematic disclosure of an embodiment of the present invention.

DESCRIPTION OF THE PREFERRED
EMBODIMENT

While the invention is applicable to various air temperature conditioning devices of either the heating, cooling, or heating and cooling types, it will be particularly described with reference to an air conditioning device comprising a gas furnace including two output stages and a refrigeration system the output of which is modulated by "on-off" cycling.

In the accompanying drawing there is illustrated schematically only the essential components of such an air conditioning device, the operations of which are controlled in accordance with the present invention. These elements include a fan 1 for circulating air from the space being conditioned through the conditioning device and the solenoid operated gas valves 2 and 3 forming part of the fuel supply to a gas furnace having a multiple stage output. These valves 2 and 3 may either individually control the flow of gas to separate burners or provide a stepped or staged flow of gas to a single burner. For summer conditioning employing a compression type refrigeration system for cooling the space air, the cooling operation is controlled by a relay 4 for operating a compressor 5. L1 and L2 represent the usual power supply lines for the fan 1 and the compressor 5 while a step down transformer 6 provides a low voltage AC power, e.g., 24 volts for the electrically controlled gas valves 2 and 3.

The modulated or staged operation of the gas valves 2 and 3 is effected by control circuitry means generally enclosed within the dotted rectangle 7 in response to changes in a variable voltage supplied to the control circuitry means 7 from a solid state thermostat 8 sensing the temperature of the space being conditioned.

More specifically, the control circuitry means 7 receives from the thermostat a low voltage signal which varies with the temperature sensed by the thermostat imposed across a positive terminal 9 and the negative terminal 10. The particular thermostat 8 is designed to provide a variable DC voltage output in the neighborhood of 10–15 volts which is dropped by a Zener diode 11 by about 8.5 volts. A filter 12 and a capacitor 14 perform in the usual manner to supply filtering and a small amount of time delay for the application of the resultant voltage to the rest of the circuit.

The remaining portion of the control circuitry illustrated for control of a two stage furnace comprises a first silicon controlled rectifier 15 and a second silicon controlled rectifier 16 and their respective voltage dividing means or networks including resistors 17 and 18 connected across the positive and negative terminals with their junction connected to the gate 19 of the rectifier 15 and resistors 20 and 21 similarly connected to the terminals and to the gate 22 of the rectifier 16. The cathodes of the silicon controlled rectifiers 15 and 16 are connected to the negative terminal 10 which terminal and associated connections are also part of a low voltage AC (24 volts) circuit including the secondary winding 23 of a stepdown transformer 24. If desired, the secondary of transformers 6 and 24 could be the same. The remaining portion of this low voltage circuit includes line 25 leading from the secondary 23 of the transformer 24 to the parallel connected coils 26 and 27 of relays 28 and 29 which respectively control the operation of the valves 2 and 3. The coil 26 is connected to the anode of the rectifier 15 and the coil 27 to the anode of the rectifier 16.

The firing of the respective rectifiers 15 and 16 is determined by the variations in the DC voltage supplied across the terminals 9 and 10 and by the voltage dividing networks of the two rectifiers. In order to obtain a stepped or modulated operation of the furnace, the voltage dividing network for rectifier 15 is designed to fire rectifier 15 at a lower voltage than rectifier 16. This may be done for example by employing resistors 18 and 21 of equal resistance values and using a resistor 17 which has a smaller resistance than the resistor 20. Thus, as the voltage of the gating voltage supply means represented by the terminals 9 and 10 gradually increases due to a decrease in temperature of the space as sensed by the thermostat 8, the rectifier 15 firing at a lower gating voltage will be the first to fire and energize the relay coil 26 to close the relay switch 36 energizing the valve 2. If the space temperature continues to decrease so that the signal voltage continues to increase, a point will be reached when the rectifier 16 will also be fired to energize the relay coil 27 and close the switch 37 to open the gas valve 3. Whenever either rectifier is fired for the first time, the resulting current flow heats it to a point where it will continue to fire until a gate-cahtode voltage lower than the initial firing voltage is reached. This drop off voltage is attained when the conditioning demand has been satisfied with a resultant decrease in the signal voltage. Preferably, resistors 17 and 20 have relatively low resistance values to ensure temperature stability and this is made possible by the use of the Zener diode 11.

While any of a number of temperature dependent variable voltage means can be employed to operate the control circuitry means 7, a preferred source of this variable voltage is a thermostat of a type illustrated. This thermostat 8 is designed to provide a variable voltage for modulated or staged operation of the gas furnace burners and an "on-off" cycling of the compressor 5.

The DC power supply for the thermostat 8 is a low voltage supply furnished by the rectifier diode 38, resistor 39 and capacitor 40 forming part of the control circuit means 7 through conductors 42 and 43 leading from the control component 7 to thermostat 8. These conductors are so connected that the thermostat terminal 44 is positive and the terminal 45 is negative. The DC supply voltage is regulated and filtered to take out any ripples and thereby compensate for changes in line voltages by Zener diodes 47 connected across the DC supply lines 44, 45.

The thermostat 8 circuitry comprises what may be generally described as a Darlington single stage differential amplifier 50 including a Darlington integrated circuit or transistor means 51 and a second Darlington transistor means 52, a fixed voltage divider circuit connecting the base of the transistor 53 across the terminals 44 and 45 and a variable voltage divider circuit including a thermistor 55 for connecting the base 54 of the transistor 52 across the terminals 44 and 45. The collector of the transistor 51 is connected to the positive terminal 44 through a fixed resistor 56 while the collector of the transistor 52 is connected to the positive terminal 44 through a relay coil 57 for operating a reed relay switch 58 when the apparatus is operating on the cooling cycle. In order to compensate for the inductive characteristic of the coil 57, a compensating circuit including the capacitor 59 is connected across the collector and base of the transistor 52. The emitter of the transistor 51 is connected through a fixed resistor 60 and a resistor 61 to the negative termnial 45 while the emitter of the transistor 52 is connected through a fixed resistor 62 (having approximately the same resistance value as resistor 60), and the resistor 61 to the terminal 45. The resistors 60 and 62, in a well known manner, provide negative feedback to the transistors 51 and 52 for transistor gain stabilization.

The fixed voltage divider circuitry for the transitor 51 includes a first fixed resistor 63 connecting the base 53 to the positive terminal 44 and a second fixed resistor 64 connecting the base to the negative terminal 45. The voltage divider circuitry for transistor 52 is designed so that the same thermistor 55 and the same differential amplifier 50 can be employed for both heating or cooling control. The voltage divider circuitry for transistor 52 includes a plurality of resistors, the thermistor 55 and two positive feedback resistors interconnected in such a manner that a single pole double throw switch means, or two single pole single throw switches, provides a reversal of the thermistor connection and thereby the use of the same differential amplifier and the same thermistor for controlling the space temperature on either heating or cooling.

More specifically the voltage divider circuitry for the transistor 52 comprises two fixed resistors 66 and 67 connected to the positive terminal 44 with the other terminal of the resistor 66 connected by a line 68 through switch 69 to the negative terminal 45 and the other terminal of resistor 67 connected by line 70 to the negative terminal 45 through switch 65. In series connection across the lines 68, 70 are a fixed resistor 71, a variable resistor 72 and the thermistor 55; the variable resistor 72 being part of the thermostat dial means for selecting the desired temperature of the space being conditioned. The base 54 of transistor means 52 is connected by line 73 to the voltage divider network between the resistors 71 and 72.

The switches 69 and 65 are respectively cooling and heating switches and provide means for connecting the voltage divider circuitry across the terminals 44 and 45 so that the thermistor 55 will be connected either between the positive terminal 44 and the transistor base 54 or between the base 54 and negative terminal 45. More specifically, during heating control operation, the switch 65 is in its closed position as illustrated and the base 54 is connected through the fixed resistors 68 and 66 to the positive terminal 44 and through the thermistor 55 and the variable resistor 72 to the negative terminal 45. On the cooling cycle, switch 65 is open and switch 69 is closed. The voltage divider circuitry from the negative to the positive terminals then comprises in sequence the resistor 67, the thermistor 55, the variable resistor 72 and the fixed resistor 68 with the thermistor 55 being connected between the base 54 and the positive terminal 44.

Numerals 75 and 76 respectively indicate positive feedback resistors which are connected across lines 68 and 70 with the junction thereof being connected by line 77 to the collector of the transistor 51. One of these resistors 75, 76 form part of a positive feedback circuit during heating operation of the thermostat and the other during the cooling operation. More specifically, in the heating operation the feedback connection from the collector of the transistor 51 to the base 54 of the transistor 52 is through the resistors 75 and 71, one end of the resistors 67 and 76 being shorted to negative terminal 45 through switch 65. During the cooling operation switch 69 is closed and the positive feedback connection includes the resistor 76; one end of the resistors 66 and 75 being shorted to the negative terminal through the switch 69.

Additional components of the control circuitry and their functions will be described in connection with the following description of the operation of the temperature control apparatus of the present invention.

During operation on the heating cycle, the thermostat 8 supplies to the valve operating control circuitry 7 a low DC voltage signal which varies with the temperature sensed by the thermistor 55. This variable voltage signal is supplied from the collector of the transistor 51 through line 77 and line 78, an emitter follower transistor 79 which isolates the circuit control 7 from the differential amplifier 50, switch 80 which is closed on the heating cycle and the terminal 9 to the voltage divider circuitry for the silicon control rectifiers 15 and 16. Also, during the heating operation, switch 65 is in the H position and the thermistor 55 is connected between the base 54, transistor 52 and the negative terminal 45. The positive feedback circuit includes resistors 71 and 75 connecting the collector of transistor 51 to the base of transistor 52. To obtain the desired control operation, the selection of the various resistors in the thermostat circuit is to some extent interdependent. For example, the positive feedback resistor 75 controls the ohms change at which the thermistor will operate within the desired voltage range and is selected, for example, so that a 200 ohms change in thermistor resistance will cause the output voltage from the thermostate to change from 10 to 15 volts under the load of the circuitry of component 7. The resistance of resistors 66 and 67 is selected to control the operating temperature ranges of the thermostat and as the same thermistor is employed for both heating and cooling operation, the value of resistors 66 and 67 should be such the thermostat calibration on the dial operating the variable resistor 72 will agree on heating and cooling.

The components of the thermostat are also selected so that during heating control operation within the thermostat control range both of the transistors 51 and 52 are conducting with their relative conduction depending upon the resistance of the thermistor 55 which in turn is dependent upon the temperature sensed by that thermistor. In the illustration of the invention, the thermistor 55 has a negative temperature coefficient with the result that as its temperature decreases, its resistance increases. As it is connected between the base 54 of transistor 52 and the negative terminal 45, an increase in resistance thereof changes the voltage divider circuitry for the transistor 52 as compared with the fixed voltage divider circuitry of the transistor 51 and results in an increased conduction of transistor 52, a corresponding decrease in conduction of transistor 51 and hence an increase in the voltage supplied to the silicon control rectifier circuitry of component 7 through lines 77, 78, etc. As this gate signal voltage reaches a certain value, the silicon controlled rectifier 15 is fired to open the gas valve 2. If the space temperature continues to decrease, the rectifier 16 will also fire to open the gas valve 3. Any subsequent decrease in resistance of the thermistor 55 due to an increase in the space temperature and the resultant decrease of voltage supplied to the silicon controlled rectifier component 7 will lower the gate-cathode voltages of the rectifiers 15 and 16 to points where they stage off thereby closing valve 3 or both valves 2 and 3.

The disclosed circuitry is also designed to provide a variable fan speed or modulated fan speed during operation on a heating cycle an cycling of the fan with the compressor on cooling operation. The fan control means includes a relay 82 including a coil 83 connected to the secondary 23 of the transformer 24 and to single pole double throw switches 84 and 85 for connecting the fan to the power supply L1, L2. The fan circuitry also includes single pole single throw switch means 87 and 88 respectively forming parts of the relays 28 and 29. With the switches 84, 85 in their heating positions as illustrated, the fan is adaptedly controlled by the switches 87 and 88 with the switch 88 bypassing or shorting a low fan speed resistor 89. Thus, when the first silicon controlled rectifier 15 is fired to operate the relay 28, the fan is connected to the supply line through switch 87 and the resistor 89 for low speed operation. Firing of the second rectifier 16 closes switch 88 to short the resistor 89 and provide high fan speed operation. A switch 90 may be provided for bypassing the switch 87 and providing at least continuous low speed operation of the fan during the heating or cooling operation. The fan control circuitry also includes a switch 92 controlling the operation of relay 82 and having a first contact 93 and a second contact 94. The contact 94 is provided for continuous high speed fan operation independent of the heating and cooling requirements of the space while the second contact 93 is part of the compressor control circuitry and provides for automatic high speed fan operation when the compressor is operating.

For cooling operation, the heating switches 65 and 80 in their C or "off" positions and the cooling switches 69 and 91 are closed. This reverses the connections of the voltage divider circuitry for the transistor 52 and provides control of the operation of compressor 5 by means of relay 4 through the relay switch 58.

More specifically, during cooling operation, the thermistor 55 is connected between the positive terminal 44 and the base 54 of the transistor 52 and the positive feedback circuit includes the resistor 76. The resistors 75 and 66 are connected to line 45. Thus the voltage supplied to the base of the transistor 52 is determined by the total resistance of its voltage divider circuitry. During cooling operation, a continuous circuit for energizing the compressor can be traced from the secondary 23 of the transformer 24 to relay 4, switch 91, relay switch 58 and back to the secondary 23. The compressor is energized so long as relay switch 58 is closed. When the thermistor senses the desired decrease in temperature of the space, its increased resistance turns transistor 52 "off" and transistor 51 "on." The resultant energization of the relay coil 57 opens the switch 58 to de-energize the compressor relay 4. Until the switch 58 is again closed, the compressor is inoperative. The fan circuit energizing the fan during the compressor "on" cycle is from secondary 23 through coil 83, contact 93, switch 91, relay switch 58 and back to the transformer secondary.

If desired, an anticipating heater 96 in heat exchange relationship with the thermistor 55 may be employed to obtain the usual anticipating action during the cooling cycle. This heater 96 is connected in parallel with the relay switch 58 through the back contact 97 of switch 65 when this switch is in its cooling position. The anticipator resistor 96 is shorted when the relay switch is closed and is therefore energized only during the cooling cycle operation and when the compressor is not operating.

From the above description, it will be seen that there has been provided a modulated temperature control apparatus which in a simple and low cost manner provides a multiple stage control of the heating means during the heating cycle operation and a modulated "on-off" control during the cooling operation. It will be appreciated of course that the staged or step-wise operation could also be employed on the cooling operation to stage for example either the number of cylinders operating in a multiple cylinder compressor or the staged energization of the plurality of cooling units, for example, a plurality of room air conditioners strategically positioned in the space being conditioned.

What I claim as new and desire to secure by Letters Patent of the United States is:

1. A temperature control apparatus for controlling the operation of an air conditioning device adapted to temperature condition a space and having at least first and second ouput stages and electrical operating means for each of said stages:
 a thermistor means for sensing the temperature of said space;
 means including first and second controlled rectifiers for respectively controlling the energization of said electrical operating means from a common low voltage AC power source, each controlled rectifier including a gate electrode and a pair of current carrying electrodes 3 said current carrying electrodes connecting said electrical operating means to said source; and a gating voltage supply means including positive and negative supply lines for supplying to said rectifiers a DC voltage which varies with the temperature sensed by said temperature sensing means, voltage dividing means for connecting the gates of each of said controlled rectifiers to said gating voltage supply lines to fire said first controlled rectifier at a first voltage and the second controlled rectifier at a different voltage level;

said gating voltage supply means comprising positive and negative terminals and means for supplying a constant direct current to said terminals from said AC source, a bridge circuit including a modified Darlington differential amplifier comprising first and second Darlington transistors each having an emitter, collector and base with the emitters thereof connected to said negative terminal through resistor means including separate fixed resistors for providing a negative feedback for stabilized amplifier gain of said transistors, resistor means connecting said first transistor base to said terminals for supplying a fixed voltage to said first transistor base, said second transistor base being connected to one of said terminals by a fixed resistance means and to the other of said terminals through said thermistor so that a variable voltage dependent upon the temperature sensed by said thermistor is applied to said second transistor base for comparison with the fixed voltage applied to said first transistor base thereby effecting a change in the relative conductivities of said transistors with the change in temperature sensed by said thermistor, positive feedback means including a feedback resistor connecting said second transistor collector to said first transistor base for increasing the differential gain of said amplifier, and means connecting the collector of one of said transistors to said positive supply line of said gating voltage supply and said negative terminal to said negative supply line to supply a gating voltage to said rectifiers which varies with the temperature sensed by said thermistor.

2. The apparatus of claim 1 in which said controlled rectifiers control the operation of a heating component of said device and said collector of said second transistor is connected to the said positive terminal by means including the coil of a relay for controlling energization of a cooling component of said device.

3. The apparatus of claim 2 including means for reversing the terminal connections of said thermistor for control of said cooling component.

4. The apparatus of claim 1 including a fan for circulating space air through said device and fan operating means for operating said fan at a low speed when said first controlled rectifier fires and at a higher speed when said second controlled rectifier fires.

5. The apparatus of claim 4 in which said fan operating means includes switch means operated by said electrical operating means.

References Cited

UNITED STATES PATENTS

| | | | |
|---|---|---|---|
| 3,254,838 | 6/1966 | Chambers | 165—27 |
| 3,138,194 | 6/1964 | Jackson et al. | 236—1 |
| 3,274,446 | 9/1966 | Nagata | 307—315 |

MEYER PERLIN, Primary Examiner

C. SUKALO, Assistant Examiner

U.S. Cl. X.R.

236—1; 307—305; 317—139

PO-1050
(5/69)

UNITED STATES PATENT OFFICE
CERTIFICATE OF CORRECTION

Patent No. 3,499,483            Dated March 10, 1970

Inventor(s) PAUL D. SCHRADER

It is certified that error appears in the above-identified patent and that said Letters Patent are hereby corrected as shown below:

In Column 6, line 66, "ouput" should read -- output -- and in column 6, line 75, "3" should read -- , --.

SIGNED AND
SEALED
AUG 4 - 1970

(SEAL)
Attest:

Edward M. Fletcher, Jr.
Attesting Officer

WILLIAM E. SCHUYLER, JR.
Commissioner of Patents